(12) United States Patent
Becker et al.

(10) Patent No.: US 10,394,833 B1
(45) Date of Patent: *Aug. 27, 2019

(54) DISPLAY OF SUGGESTED COLOR PALETTES WITH IMAGES RESPONSIVE TO SEARCH QUERIES

(71) Applicant: SHUTTERSTOCK, INC., New York, NY (US)

(72) Inventors: Chris Becker, New York, NY (US); David Kroner, Brooklyn, NY (US); Steve Blaurock, Queens, NY (US)

(73) Assignee: SHUTTERSTOCK, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,303

(22) Filed: Jan. 4, 2018

Related U.S. Application Data

(63) Continuation of application No. 14/701,549, filed on May 1, 2015, now Pat. No. 9,910,897.

(Continued)

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/248* (2019.01); *G06F 16/313* (2019.01); *G06F 16/5838* (2019.01); *G06F 16/5866* (2019.01)

(58) Field of Classification Search
CPC combination set(s) only.
See application file for complete search history.

(56) References Cited

U.S. PATENT DOCUMENTS

| 5,086,295 A | 2/1992 | Boettcher et al. |
| 5,299,116 A | 3/1994 | Owens et al. |

(Continued)

FOREIGN PATENT DOCUMENTS

| WO | WO-2014/070168 A1 | 5/2014 |
| WO | WO-2014/070914 A1 | 5/2014 |

OTHER PUBLICATIONS

Flickner et al., "Query by image and video content: The QBIC system," Computer, 28(9) pp. 23-32, 1995.

(Continued)

*Primary Examiner* — Farhan M Syed
(74) *Attorney, Agent, or Firm* — McDermott Will & Emery LLP

(57) ABSTRACT

A method and system for conducting image search comprising: searching a first database to locate a set of pertinent images, iteratively performing the following operations for each image in the set of pertinent images: (a) extracting the histogram of red green and blue colors (RGB colors) from a given image; (b) distilling the extracted RGB colors down to create a reduced color palette for the given image; (c) segmenting the extracted RGB colors into a set of segments representing distinct parts of the color spectrum; (d) selecting a subset of segments to assemble a color palette for the given image; and (e) updating the assembled color palette and the customer behavior score for the given image in the first database; and generating a display of suggested color palettes for the search query.

18 Claims, 7 Drawing Sheets

Related U.S. Application Data

(60) Provisional application No. 61/988,962, filed on May 6, 2014.

(51) Int. Cl.
*G06F 16/248* (2019.01)
*G06F 16/31* (2019.01)
*G06F 16/583* (2019.01)
*G06F 16/58* (2019.01)

(56) References Cited

U.S. PATENT DOCUMENTS

| | | | |
|---|---|---|---|
| 5,307,182 A | 4/1994 | Maltz | |
| 5,313,231 A | 5/1994 | Yin et al. | |
| 5,434,957 A | 7/1995 | Moller | |
| 6,185,385 B1 | 2/2001 | Mestha et al. | |
| 6,385,336 B1 | 5/2002 | Jin | |
| 6,518,981 B2 | 2/2003 | Zhao et al. | |
| 6,859,210 B2 | 2/2005 | Luo et al. | |
| 7,023,577 B2 | 4/2006 | Watanabe et al. | |
| 7,126,612 B2 | 10/2006 | Sekiguchi et al. | |
| 7,715,624 B2 | 5/2010 | Nishida | |
| 7,864,999 B2 | 1/2011 | Chang et al. | |
| 7,873,521 B2 * | 1/2011 | Kurozumi | G06K 9/00758 704/270 |
| 8,502,864 B1 | 8/2013 | Watkins | |
| 8,508,547 B2 * | 8/2013 | Klassen | G06T 11/001 345/581 |
| 8,576,241 B1 | 11/2013 | Kanter et al. | |
| 8,587,604 B1 | 11/2013 | Kanter et al. | |
| 8,593,478 B2 * | 11/2013 | O'Brien-Strain | H04N 1/644 345/589 |
| 8,630,485 B2 | 1/2014 | Cok et al. | |
| 8,634,640 B2 * | 1/2014 | Bhatti | G01J 3/462 382/167 |
| 8,756,241 B1 | 6/2014 | Thite | |
| 8,890,884 B2 | 11/2014 | Zhang | |
| 9,002,100 B2 * | 4/2015 | Lecerf | G06K 9/6254 382/154 |
| 9,390,168 B1 | 7/2016 | Dykstra et al. | |
| 9,582,517 B2 * | 2/2017 | Chester | G06K 9/4652 |
| 9,792,303 B2 | 10/2017 | Sayre, III et al. | |
| 2001/0003814 A1 | 6/2001 | Hirayama et al. | |
| 2002/0080153 A1 | 6/2002 | Zhao et al. | |
| 2002/0094124 A1 | 7/2002 | Kim | |
| 2005/0055344 A1 | 3/2005 | Liu et al. | |
| 2006/0193538 A1 | 8/2006 | Vronay et al. | |
| 2006/0195325 A1 | 8/2006 | Tateson et al. | |
| 2006/0218522 A1 | 9/2006 | Hanechak | |
| 2006/0248081 A1 | 11/2006 | Lamy | |
| 2007/0188445 A1 * | 8/2007 | Silverstein | G06F 3/03542 345/156 |
| 2007/0188478 A1 * | 8/2007 | Silverstein | G06F 3/03542 345/179 |
| 2008/0046409 A1 | 2/2008 | Lieb | |
| 2008/0046410 A1 | 2/2008 | Lieb | |
| 2009/0003892 A1 | 1/2009 | Sakaizawa | |
| 2009/0041345 A1 | 2/2009 | Tirumalareddy et al. | |
| 2009/0252404 A1 * | 10/2009 | Lecerf | G06K 9/6254 382/154 |
| 2009/0281925 A1 | 11/2009 | Winter et al. | |
| 2010/0158412 A1 * | 6/2010 | Wang | G06F 16/5838 382/305 |
| 2011/0085697 A1 | 4/2011 | Clippard et al. | |
| 2011/0135195 A1 * | 6/2011 | Marchesotti | G06K 9/4652 382/165 |
| 2011/0184950 A1 * | 7/2011 | Skaff | G06K 9/00664 707/737 |
| 2011/0191334 A1 * | 8/2011 | Hua | G06F 16/00 707/726 |
| 2011/0289082 A1 | 11/2011 | Townsend | |
| 2011/0313927 A1 | 12/2011 | Savilia et al. | |
| 2012/0045121 A1 | 2/2012 | Youngman et al. | |
| 2012/0075329 A1 * | 3/2012 | Skaff | G09G 5/06 345/593 |
| 2012/0099784 A1 * | 4/2012 | Marchesotti | G06F 16/5838 382/162 |
| 2012/0163710 A1 * | 6/2012 | Skaff | G06K 9/6226 382/165 |
| 2012/0166472 A1 * | 6/2012 | Hoppenot | G06F 3/041 707/769 |
| 2012/0189340 A1 | 7/2012 | Hagiwara | |
| 2012/0224764 A1 | 9/2012 | Weng | |
| 2012/0239506 A1 * | 9/2012 | Saunders | G06Q 30/02 705/14.67 |
| 2012/0254790 A1 | 10/2012 | Colombino et al. | |
| 2013/0073336 A1 | 3/2013 | Heath | |
| 2014/0019484 A1 | 1/2014 | Coppin et al. | |
| 2014/0055484 A1 | 2/2014 | Moon et al. | |
| 2014/0089295 A1 | 3/2014 | Becherer et al. | |
| 2014/0096009 A1 * | 4/2014 | Grosz | G06F 3/1242 715/733 |
| 2014/0201634 A1 * | 7/2014 | Hill | G06F 3/0482 715/716 |
| 2014/0270498 A1 * | 9/2014 | Chester | G06K 9/4652 382/162 |
| 2014/0304661 A1 | 10/2014 | Topakas et al. | |
| 2014/0334722 A1 * | 11/2014 | Bloore | G06F 16/5838 382/164 |
| 2015/0039994 A1 | 2/2015 | Hoguet | |
| 2015/0046254 A1 | 2/2015 | Raab et al. | |
| 2015/0081469 A1 | 3/2015 | Acharyya et al. | |
| 2015/0110381 A1 * | 4/2015 | Parvin | G06K 9/6249 382/133 |
| 2015/0170380 A1 | 6/2015 | Duwenhorst | |
| 2015/0181469 A1 | 6/2015 | Yu | |
| 2015/0199010 A1 * | 7/2015 | Coleman | A61B 5/0006 345/156 |
| 2015/0220578 A1 | 8/2015 | Hunt et al. | |
| 2015/0310010 A1 | 10/2015 | Brenner et al. | |
| 2015/0324365 A1 | 11/2015 | Becker et al. | |
| 2015/0324366 A1 | 11/2015 | Becker et al. | |
| 2015/0324392 A1 | 11/2015 | Becker et al. | |
| 2015/0324394 A1 | 11/2015 | Becker et al. | |
| 2015/0378999 A1 | 12/2015 | Dorner et al. | |
| 2015/0379004 A1 | 12/2015 | Sayre, III et al. | |

OTHER PUBLICATIONS

Flickner, et a., "Query by image and video content: The QBIC system," Computer 28(9), pp. 23-32 1995.
Smith, et al., "VisualSEEK: a fully automated content-based image query system", In Proceedings of the fourth ACM International Conference on Multimedia, pp. 87-89, ACM, 1997.

* cited by examiner n: number of colors in the image
D: distance between two colors in the LCH color space (a number between 0 and ~300)
P: percentage of the image covered by the given color (a number between 0 and 100)
W: weight for a given color
x: the specific color being assigned a weight $$W[x] = P[x] \times \prod_{i=1}^{n} \begin{cases} D[x,i] <= 40 & 1 + 100 \times ((P[i] / 100) \times (D[x,i] / 300)) \\ D[x,i] > 40 & 1 - 100 \times ((P[i] / 100) \times (D[x,i] / 300)) \end{cases}$$

FIGURE 8

DISPLAY OF SUGGESTED COLOR PALETTES WITH IMAGES RESPONSIVE TO SEARCH QUERIES

CROSS-REFERENCE TO RELATED APPLICATIONS

This application is a continuation of U.S. patent application Ser. No. 14/701,549 filed on May 1, 2015, which claims the benefit of priority under 35 U.S.C. § 119 from U.S. Provisional Application No. 61/988,962 entitled "COLOR PALETTE SUGGESTIONS," filed on May 6, 2014. The disclosure of which are hereby incorporated by reference in their entirety for all purposes.

BACKGROUND

1. Field of Disclosure

The present disclosure generally relates to a color palette suggestion system, and, more particularly, to systems and methods for conducting a keyword, a color and a trend based image search in response to a user presenting a search query.

2. Background of the Invention

Searching pertinent images over the Internet can be a particularly challenging task for artists and designers. The commercial systems may require an artist to select a single image from a pool of millions of images that may be retrieved for a keyword search query. In marketing, the precise image selection for a product may directly be linked with the commercial success of a product. An artist may be required to conduct a complex search query to perform an image search based on a keyword and a color. In that case, artists may have to create and discover color palettes to meet their business needs or aesthetic tastes. When an artist is searching for the keyword "ocean," the Internet search engine may return a large number of images associated with the keyword ocean in various colors and shades.

The artist may then have to run a second query to locate a desired image in a desired color combination from the pool of several images. For example, the artist may have to specifically configure a query to fetch all images that are associated with the keyword "ocean" and that are blue in color. The above mentioned query may be run by the existing image search systems to perform a two layered image search i.e. first images are searched by a keyword and the retrieved images are then searched by the color. Thus, the existing image search systems do not offer a palette selection option, coupled with a keyword search option. Further, the artist using existing image search systems may have to reinvent a palette for each keyword search since there does not exist a way to save and export preferred color pallets. Furthermore, the artist does not have a way to take advantage of image selection trends reflected by the image retrieval and download data gathered from the previous searches performed on the particular keyword and color selection. Accordingly, a need exists for a palette selection system that can present images based at least on the image trend, the color criteria and the keyword criteria.

3. Brief Summary

By way of introduction only, the present embodiments provide methods and systems for conducting image searches comprising: searching a first database to locate a set of pertinent images; iteratively performing the following operations for each image in the set of pertinent images: (a) extracting the histogram of red green and blue colors (RGB colors) from a given image, (b) distilling the extracted RGB colors down to create a reduced color palette for the given image, (c) segmenting the extracted RGB colors into a set of segments representing distinct parts of the color spectrum, (d) selecting a subset from the set of segments to assemble a color palette for the given image, and (e) updating the assembled color palette and a customer behavior score for the given image in the first database; and generating a display of suggested color palettes for the search query.

The disclosed systems may present users with multicolor palettes that best match the searched concept and the keyword. Among the presented multicolor palettes, a specific multicolor palette can be selected by the user in order to retrieve all images in the given image depository that match the specific palette and the user specified keyword. Alternatively, the disclosed system may allow the user to create a palette and retrieve all images in the image depository that match the user specified palette and the user specified keyword.

According to one aspect of the present invention, systems and methods are disclosed for generating color palettes from the given image depository in response to a user query. In one embodiment of the disclosed system, a high volume of color combinations can be generated automatically for a search query.

According to another aspect of the present invention, systems and methods are disclosed for designing a color palette. When an artist is searching for the keyword "ocean," the Internet search engine may return a large number of images associated with the keyword ocean in various colors and shades. For example, the above mentioned query may return color palettes containing various shades of blue from the photos of water, various shades of browns from the photos of beaches, the various shades of reds from photos of ocean sunsets, and the like.

In another embodiment, the system has an ability to display trends for a given image. Thus, the user can optionally select an image that was downloaded by many other users. Accordingly, the system may define popular palettes for certain groups of customers. For example, a popular palette may indicate specific images that are popular among college students just in time for Valentine's Day. In another embodiment, the system may have the ability to suggest color themes based on seasonal or popular trends, like certain red and green palettes may be especially popular around Christmas time.

In yet another embodiment, the system has an ability to help customers configure their desired palettes. Additionally, the system may allow the customers to discover palettes configured by others as well as save or export a particular palette that is of interest to the customer. This may save customer time, money and other resources required to reinvent that palette that works for the customer.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

In another embodiment, relevant search queries are further sorted by using user search data to score color palettes by the keyword. Thus, a high volume of color combinations can be applied to locate relevant images in response to the search queries.

4. Brief Description of Several Views of the Drawings

The patent or application file contains at least one drawing executed in color. Copies of this patent or patent application publication with color drawing(s) will be provided by the Office upon request and payment of the necessary fee.

Figure 4:
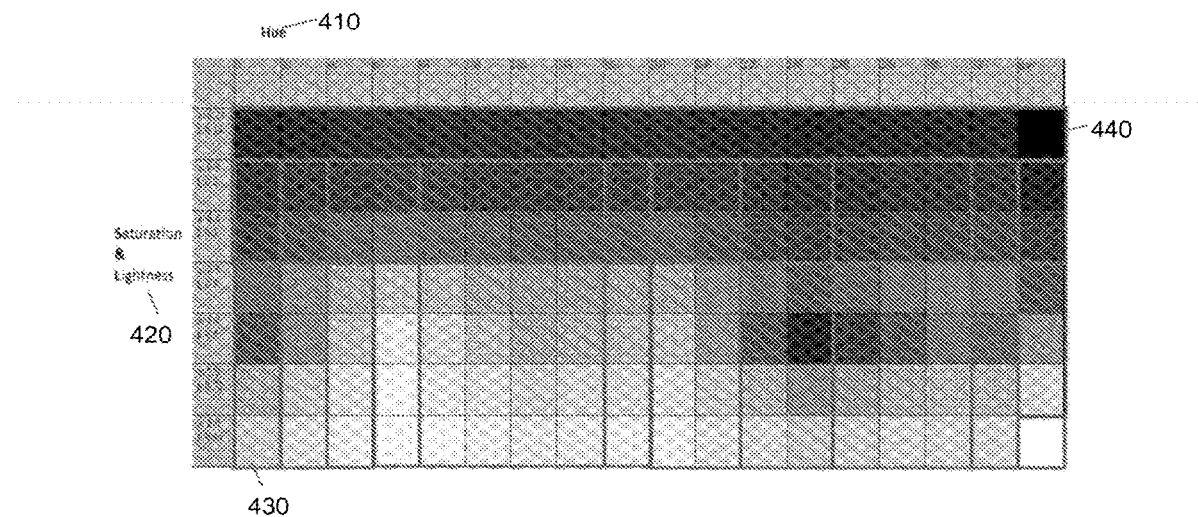
Figure 5:
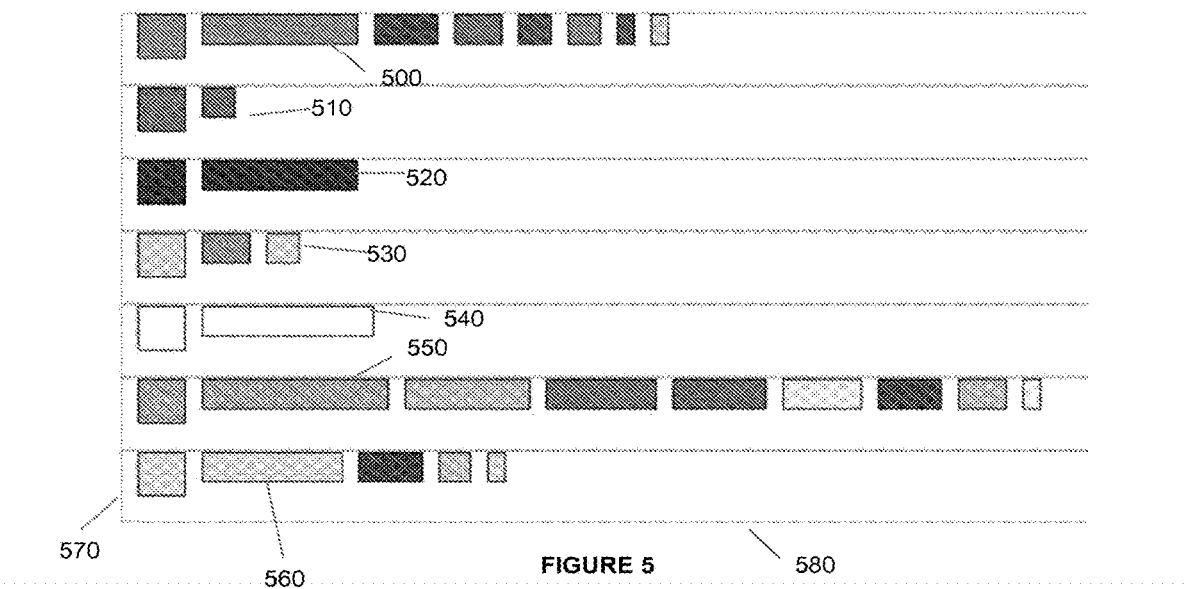
Figure 6:
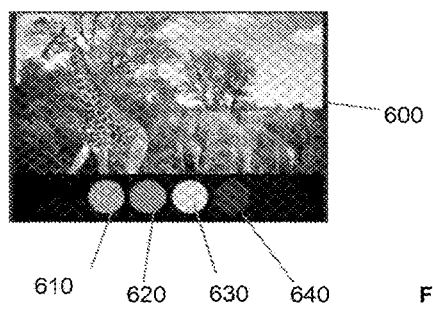
Figure 7:
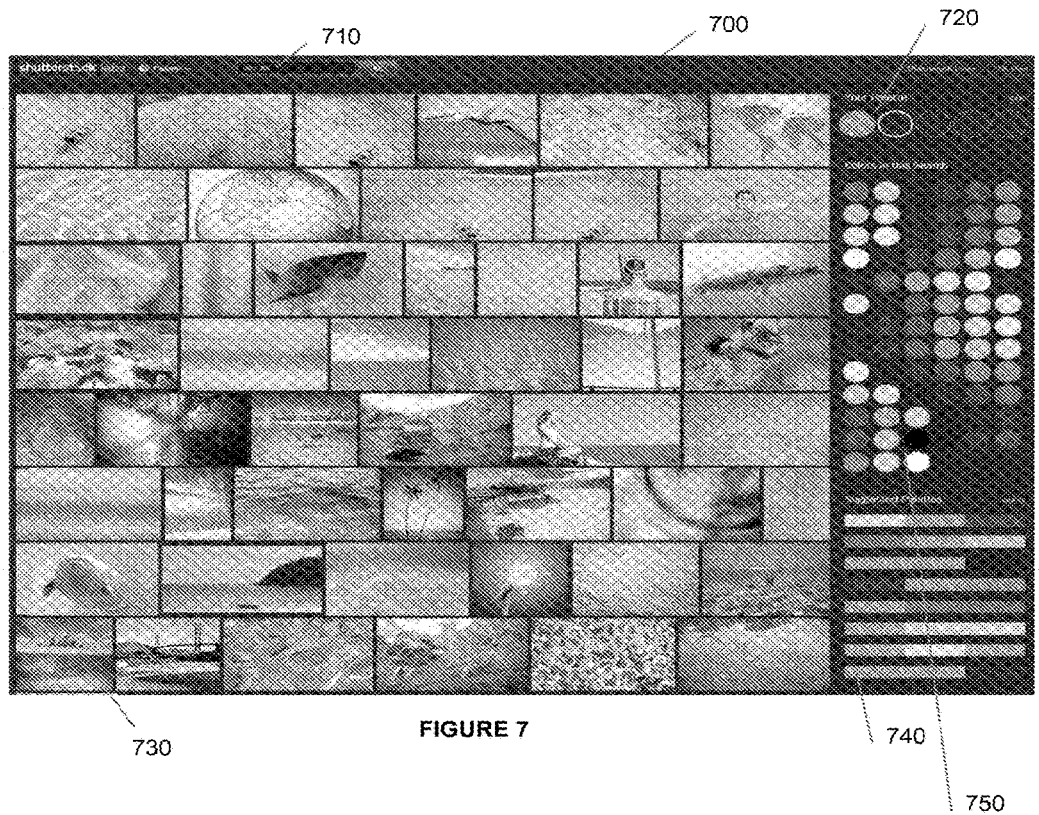

FIG. 4 indicates the fashion in which the colors from the reduced color palettes are divided up into clusters;

FIG. 5 depicts the process of scoring the color segments based on the volume of all the colors within the color segments;

FIG. 6 depicts an example of the four color palette for a given image;

FIG. 7 illustrates a process of ranking the color palettes based on the customer behavior score of the keywords matching the search query; and FIG. 8 depicts an exemplary set of mathematical operations that can be performed to compute the color weight score.

5. Detailed Description of the Presently Preferred Embodiments

The present disclosure describes a computer implemented method for conducting a keyword, a color and a trend based image search in response to a user presenting a search query on a user interface of a computing device, the method comprising: (1) searching a first database to locate a set of pertinent images corresponding to the search query, the first database comprising an image representation (image), a set of keywords associated with the image, a customer behavior score for each keyword in the set of keywords, and a list of keywords previously used to locate the image; (2) iteratively performing the following operations for each image in the searched set of pertinent images: (a) extracting the histogram of red green and blue colors (RGB colors) from a given image, (b) distilling the extracted RGB colors down to create a reduced color palette for the given image based on the proximity of the extracted RGB colors in the RGB color space, (c) segmenting the extracted RGB colors into a set of segments representing different, visually distinct parts of the color spectrum, and black and white colors, (d) selecting a subset of segments from the set of segments satisfying a predetermined criterion to assemble a color palette for the given image, and (e) updating the assembled color palette and the customer behavior score for the given image in the first database; and (3) generating a display of suggested color palettes for the search query.

Figure 1:
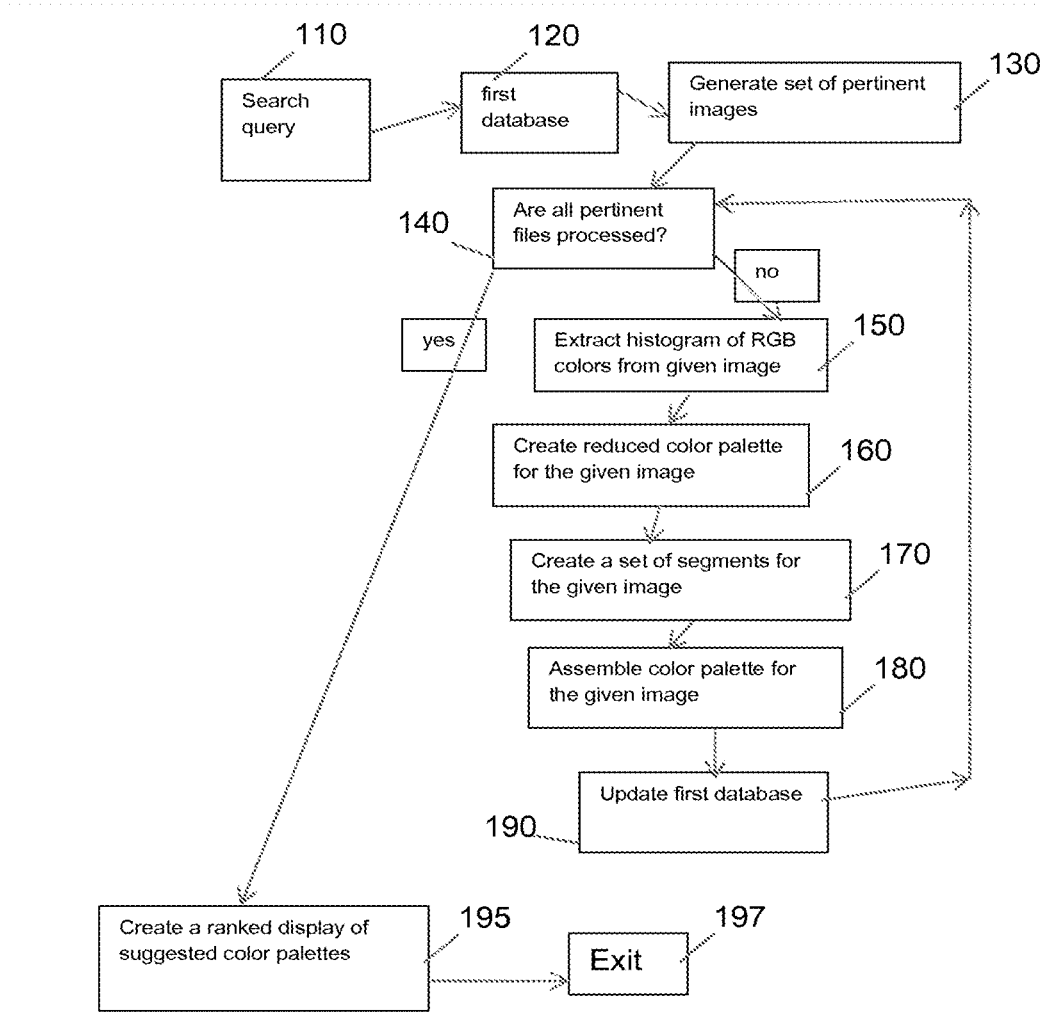
FIG. 1 illustrates a flow chart depicting various steps performed in conducting a keyword, a color and a trend based image search according to the preferred embodiment of the disclosed method.

FIG. 1 illustrates a flow chart depicting various steps performed in conducting a keyword, a color and a trend based image search according to the preferred embodiment of the disclosed method. The process may receive a search query from a user via a user interface of a computing device, not shown in FIG. 1, at block 110. The search query may indicate user's interest in searching images for the specified keyword for example, a sea. Notably, the user may not specify a color of desired image at this point. However, in another embodiment, the user may indicate the intended image color and shade. The process may conduct image search based on the user specified keyword and color constraint.

The process may, at block 120, search a first database to fetch all the images that satisfy the keyword criterion specified in the search query. All the images that meet the searched keyword criteria are herein referred to as a set of pertinent images, since these images may possibly be of interest to the user. In other words, the process may search a first database to locate a set of pertinent images corresponding to the search query. At block 130, the process may generate a set of pertinent images for the user after searching the first database at block 120. The first database may comprise several records; each record may have an associated image representation (image), a set of keywords associated with the image. Furthermore, each record may also have a customer behavior score for each keyword in the set of keywords, and a list of keywords that were previously used by other users to locate the image.

In one embodiment of the disclosed invention, the customer behavior score is based on aggregate user activity for an image. This may include searches that were conducted in the past which led the user to indicate interest in the given image. User interest is indicated by the user purchasing the image, the user clicking on the image, or displaying other signals indicating the user's interest in that image. In this context, the other signals may include for example, the user adding the image to a lightbox or favorites list, and hovering the cursor over the thumbnail image to view a larger preview, or performing any of the above mentioned activities on images contributed by the same artist from the same photo shoot or illustrated image set. In this embodiment of the disclosed invention, the customer behavior scores may be aggregated per search query and used to identify the most relevant keywords or categories for an image.

In another embodiment of the disclosed invention the customer behavior scores may be aggregated over a period of time and may represent customer activity for a specific period of interest such as a season. For example, an abstract image of a red and green background may generate more customer interest in the Christmas season. As a result, the image is likely to receive a disproportionate number of its annual purchases during the three month period prior to Christmas time as compared to other images having the color schemes that are unrelated to Christmas. If a particular image received higher volume of customer activity during a specific time of the year, then the disclosed search system can rank the particular image higher in results during the same time of year. For example, if 30% of the total image downloads for image A had occurred in the month of November, and for 10% of total image downloads for image B had occurred in the month of November, then the image A will be ranked higher than image B in search results during the month of November.

At block 140, the process may determine whether all of the pertinent images generated at block 130 are processed. If the process determines that all pertinent files processed are not yet processed, then the process iteratively performs the operations described in conjunction with blocks 150-190 for each image in the searched set of pertinent images. In other words, the process iteratively performs the operations described in conjunction with blocks 150-190 until all the images for each image in the searched set of pertinent images are processed. In this context, the term "given image" indicates a particular image from the set of pertinent images upon which the operations described in conjunction with blocks 150-190 are being performed.

First, the process may move to block 150 to extract the histogram of red green and blue colors (RGB colors) from a given image. The process of extracting histogram of red green and blue colors (RGB colors) from a given image is further illustrated in conjunction with FIG. 2. At this point, the process may consider the following image data: a thumbnail representation of the given image, which may be an approximately 100 pixels on a side representing a shrunken version of the full size image, a list of keyword tags associated with the given image; and a list of keywords that were used by customers to find the given image along with a score based on customer behavior for the given image.

Then the process may move to block 160 to distill the extracted RGB colors down to create a reduced color palette for the given image based on the proximity of the extracted RGB colors in the RGB color space. Then the process may move to block 170 to segment the extracted RGB colors into a set of segments representing different, visually distinct parts of the color spectrum, and black and white colors before moving to block 180 to select a subset of segments from the set of segments that satisfy a predetermined criterion to assemble a reduced color palette for the given image. Finally, the process may update the assembled reduced color palette and the customer behavior score for the given image in the first database before returning to block 140 to determine whether all pertinent files are processed.

Alternatively, at block 140, if the process determines that all pertinent files are processed, then the process may move to block 195 to generate a display of suggested color palettes for the search query. Then the process may exit at block 197.

Figure 2:
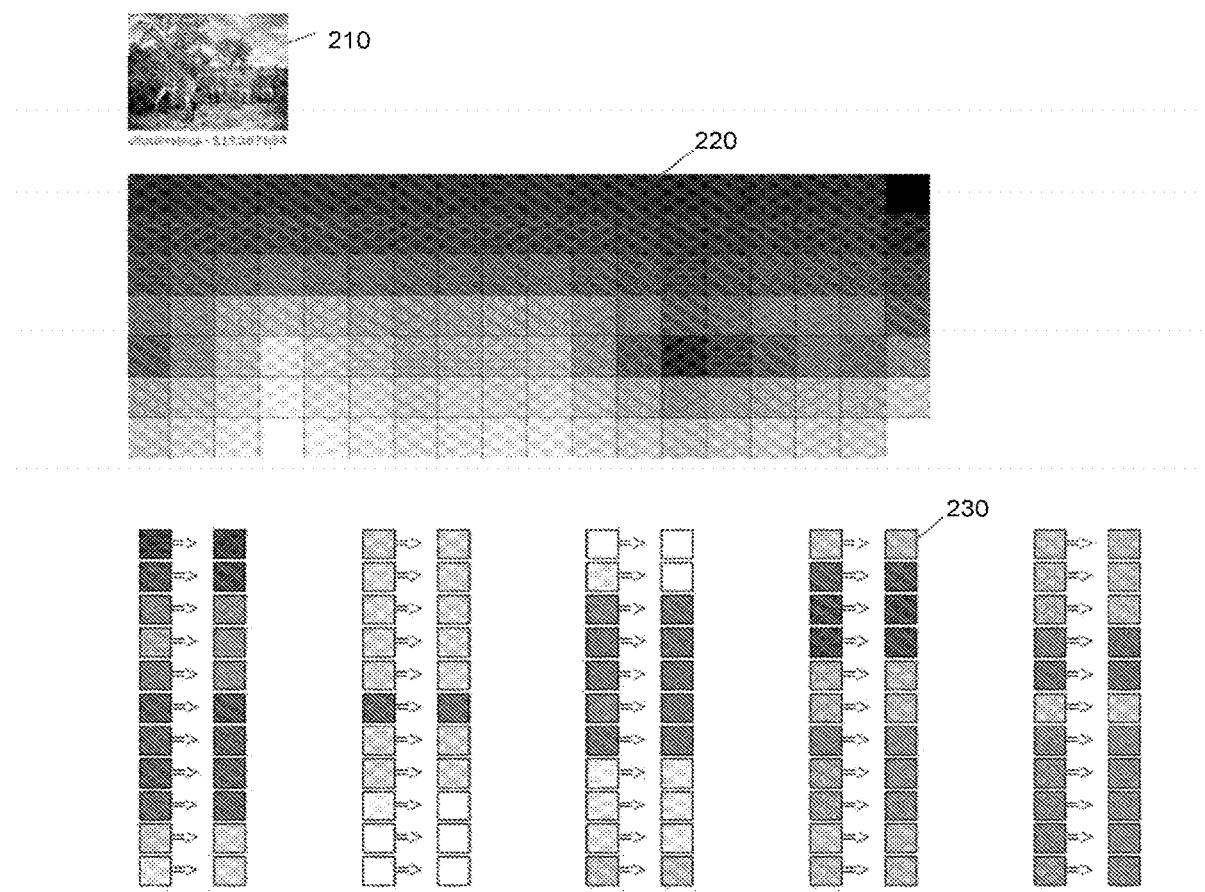
FIG. 2 illustrates an example of a reduced color palette, wherein the colors extracted from the image are distilled down to values present in the reduced color palette.

FIG. 2 illustrates an example of a reduced color palette, wherein the colors extracted from the given image are distilled down to values present in the reduced color palette 220. An image 210 is a thumbnail representation of a given image from the set of pertinent images as described above in conjunction with FIG. 1. The image 210 may be a shrunken version of the full size image and can be of a 100 pixels on a side dimensions. As described above, the process may extract the histogram of RGB colors from the image thumbnail 210 and distill the extracted RGB colors down to create a reduced color palette 220 for the image 210 based on the proximity of the extracted RGB colors in the RGB color space.

The process may iteratively process each color in the reduced color palette by performing a set of operations for each color in the reduced color palette. In particular, the process may iteratively perform, for each color in the reduced color palette, the operations of assigning: (1) a color volume score to the given color, (2) a color weight score to the given color, and (3) the percentage of a set of proximate colors. The process may assign the color volume score to each color in the reduced color palette at block 229. The color volume score may be assigned to each color in the reduced color palette based on the amount of that individual color present in the given image.

In other words, the color volume score for a given color may indicate the percentage of the given image covered by the given color. Thus, in an image of sky, where blue color covers the entire image of the sky, the color volume score for blue color will be 100%. In contrast, in a blue and green colored image depicting birds, where some birds are flying in the blue sky up high and some birds pecking seeds in the green grass below, the color volume score for the color blue will be less than 100% since the green grass will occupy at least some percentage of the image. Likewise, the colors of the birds will also occupy some percentage of the image.

Figure 3:
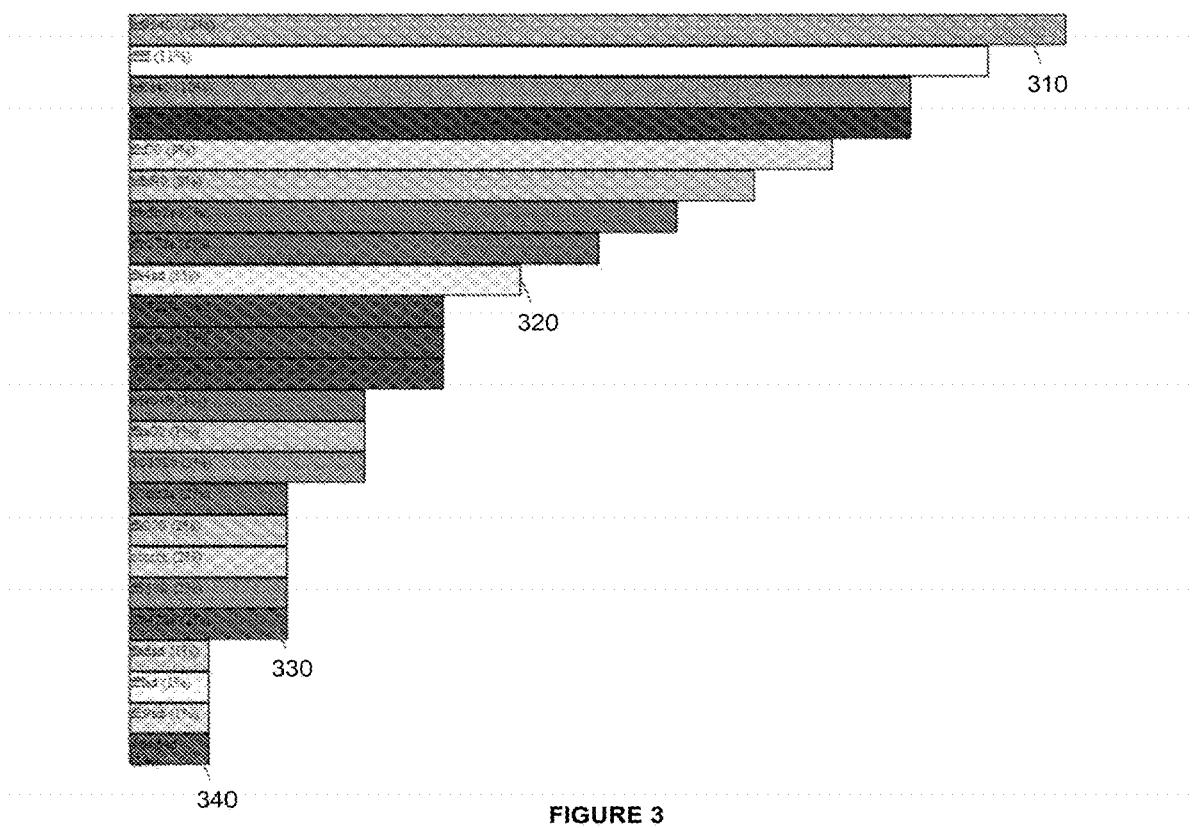
FIG. 3 depicts the manner in which a plurality of color segments are defined based on visually distinctive regions of the spectrum.

This phenomenon is described further in detail in conjunction with FIG. 3. FIG. 3 depicts the manner in which a plurality of color segments is defined based on visually distinctive regions of the spectrum. The color bf9540 indicated by the reference numeral 310 has occupied 12% of the image; this color volume score is in sync with the thumbnail representation of the image 210 since mustard color does appear to cover 12% of the image 210. Likewise, the color ffe4ed indicated by the reference numeral 320 has the color volume score of 5% since off white color appears to have occupied 5% of the thumbnail representation of the image 210. Similarly, 6b422e indicated by the reference numeral 330 has the color volume score 2% and the color 4d4d4d indicated by the reference numeral 340 has the color volume score 1%.

Furthermore, the process may iteratively assign a color weight score for each color in the reduced color palette. The color weight score may indicate the percentage of the given color in the given image. Notably the term "given image" is an image from the set of pertinent images that is currently being processed and the term "given color" is a color from the reduced color palette that is being assigned the color weight score. The color weight score may be based on the occurrence of other visually similar colors in the given image. The color weight score may indicate a numeric score based on the percentage of the given color in the given image, and the percentage of other colors located within a certain predefined distance in the RGB color space from the given color, and the measure of distance between the given color and the other colors situated within the certain predefined distance in the RGB color space from the given color.

A set of mathematical operations may be performed to compute the color weight score. One example of a formula is illustrated in FIG. 8. As indicated in FIG. 8, the weight of a color is weighted up or weighted down by either by color percentage of the given color in the given image or by the color distance of the given color and every other color in the given image. However, other formulae may also be used to compute the color weight score. The color weight score may be used to ascertain how closely related are the colors in the given image. For example, in a given image, a shade of green may have a higher color weight score if the given image is covered by a wide variety of greens. However the same shade of green may be weighted lower if it the given image is covered completely by shades of red.

Further, for each given color, the process may also identify a set of proximate colors such that each color in the set of proximate colors is located within a predefined distance from the given color in the RGB color space. Next, the process may ascertain the percentage of a set of proximate colors in the given image. The process may also identify the measure of the distance between the given color and the set of proximate colors in the RGB color space. Finally, the process may perform the indexing operations on the color volume score, the color weight score, the customer behavior score and the percentage of the set of proximate colors for the given color in a search engine. The indexing operations may be helpful in a subsequent image search of the given image via the search engine.

Now referring back to FIG. 2. The process then may divide or segment the extracted RGB colors into a set of segments or buckets 230 wherein the set of segments may represent different, visually distinct parts of the color spectrum, and black and white colors. After generating the set of segments, the process may select a subset of segments satisfying a predetermined criterion to assemble a color palette for the given image, and update the assembled color palette and the customer behavior score for the given image in the first database. Finally, the process may generate a display of suggested color palettes for the search query. This phenomenon is illustrated in FIG. 4.

FIG. 4 indicates the fashion in which the colors from the reduced color palettes are divided up into clusters. In FIG. 4, x axis represents a hue value 410 of the given shade of the given color and y axis represents a saturation and lightness value 420 for the given shade of the given color. For example, a very light shade of peach color indicated by reference numeral 430 appears to have least hue value 410 as well as least saturation and lightness value 420. Likewise, a very dark shade of gray color indicated by reference numeral 440 appears to have maximum hue value 410 as well as maximum saturation and lightness value 420. The colors that were extracted from the given image are divided up into segments or buckets representing different visually distinct parts of the color spectrum, plus black and white colors. According to one embodiment of the disclosed invention, the segments may be defined manually by dividing the color spectrum into sections that are visually distinct from each other. In another embodiment, the segments may be defined algorithmically using a variety of algorithmic techniques.

For each segment in the set of segments, the process may iteratively assign a color score to each color in a given segment to ascertain a color that represents the given segment as a whole. In this context, the term "given segment" indicates a particular segment from the set of segments, wherein each color in the particular segment is being assigned a color score. The segment score maybe determined by a product of the color volume score, a color lightness measure and a color chroma measure and wherein the color having the highest color score in a given segment is designated to represent the given segment.

To compute the color score for a specific color, the specific color is converted to the LCH * color space, which produces three values: a lightness value, a chroma value, and a hue value for the specific color. The color score is determined by computing a product of the color volume score, the lightness value, and the chroma value. Resultantly, the color with the highest color score is the brightest, most saturated, and most abundant color in that segment. Accordingly, the color with the highest color score in a particular segment may be used to represent the particular segment.

Likewise, for each segment in the set of segments, the process may iteratively assign a segment score, wherein the segment score for a particular segment is computed by aggregating the color volume scores for each color in the particular segment. In other words, the segment score for a specific segment may be based on the sum of the color volume scores of each color in the given image within the specific segment. This phenomenon is further described in conjunction with FIG. 5.

FIG. 5 illustrates the manner in which the colors may be divided into one or more clusters. In FIG. 5, x axis represents the segment score i.e. the aggregate color volume scores for each color in the particular segment 580 for the given segment and y axis represents the given segment 570. FIG. 5 depicts the process of scoring the color buckets based on the volume of all the colors within them wherein, the representative colors from the top buckets are used to generate a color palette for the given image. FIG. 5 depicts seven color clusters indicated by the reference numerals 500, 510, 520, 530, 540, 550, and 560. In one embodiment of the disclosed invention, the top three segments having the highest segment score may be selected in order to assemble a color palette that best represents the given image. In another embodiment of the disclosed invention, the top four segments having the highest segment score may be selected in order to assemble a color palette that best represents the given image. In this embodiment, the color from the color segments indicted by the reference numerals 550, 500, 560 and 520 may be selected to assemble a color palette.

An example of the four color palettes derived from the image 600 is illustrated in FIG. 6. The color segments 610, 620, 630, and 640 in are selected to assemble a color palette that best represents an image 600. Notably, as shown in FIG. 5, the colors represented by the reference numerals 550, 500, 560 and 520 correspond to the color segments 610, 620, 630 and 640 respectively. The four the color segments 610, 620, 630 and 640 are scored based on the volume of all the colors the color segments 610, 620, 630 and 640. Thus, the representative colors from the top segments are used to generate a color palette for the given image 600.

In yet another embodiment of the disclosed invention, the top five segments having the highest segment score may be selected in order to assemble a color palette that best represents the given image. After generating the color palette that best represents the given image, the generated palette is then stored in a database along with the customer behavior scores for the given image from which the colors in the color palette were extracted. Notably, the disclosed invention may be used to derive any number of color palettes that best represents the given image. In another embodiment of the disclosed invention, the process may select a predefined number of segments having the highest segment scores for assembling a color palette representation for a given image.

FIG. 7 illustrates search results displayed in response to a search query entered by a user. As described above, the process may generate a ranked display of suggested color palettes for the search query by aggregating the customer behavior scores for the search query across all images from which the color palette was extracted from. The display of suggested color palettes is shown in FIG. 7. Interface 700 shows selective set of images derived in response to the search query. Area 700 illustrates a search box 710 where the user may enter a keyword to conduct a search query.

In FIG. 7, for example, the user has entered the keyword ocean in the search box 710. Responsively, the selected pallet is displayed at location 720. The colors of the images shown on the interface 700 indicated by the reference numeral 730 are taken from the colors in the selected pallet indicated by the reference numeral 720. The area 750 on the interface 700 indicates the different colors that are displayed in the images 730 on the interface 700. Likewise the suggested color palettes 740 are displayed on the interface 700. The interface may dynamically change the images 730 that are displayed on the interface 700 in response to the user selecting any palette from the list of the suggested color palettes 740 to replace the selected color palette 720.

The invention claimed is:

1. A method for providing a display of color palettes in response to a user search query, the method comprising:
   receiving from a user a search query on a user interface of a computing device;

searching a database to locate images responsive to the search query, wherein for each image, the database comprises an image representation and a set of keywords associated with the image;

extracting red, green, and blue (RGB) colors for each responsive image to provide extracted RGB colors from the responsive image;

creating a reduced color palette comprising a plurality of colors for each responsive image based on a proximity of the extracted RGB colors in a RGB color space;

assigning, to each of the plurality of colors for a responsive image, a color volume score and a color weight score, wherein the color volume score indicates a percentage of the responsive image covered by the respective color, and the color weight score indicates the percentage of the respective color in the responsive image;

ascertaining a percentage of a set of proximate colors in the responsive image, wherein each color in the set of proximate colors is located within a predefined distance from the respective color in the RGB color space;

indexing the percentage of the set of proximate colors for the respective color, the color volume score, and the color weight score, in a search engine for a subsequent image search;

dividing the extracted RGB colors for each responsive image into a set of segments representing visually distinct parts of a color spectrum;

assembling a color palette for each responsive image based on the extracted RGB colors; and providing for display of suggested color palettes for the search query based on the assembled color palettes for the responsive images.

2. The method of claim 1, further comprising:
identifying a measure of the distance between the respective color and the set of proximate colors in the RGB color space.

3. The method of claim 1, wherein the color weight score for a respective color is weighted based on the percentage for every color other than the respective color in the responsive image and the color distance in the RGB color space between the respective color and every color other than the respective color in the responsive image.

4. The method of claim 3, further comprising:
assigning, for each segment in the set of segments, a color score to each color in a respective segment to ascertain a color that represents the respective segment; and
assigning a segment score to the respective segment by aggregating the color volume scores of each color in the respective segment.

5. The method of claim 3, further comprising:
assigning a color score to each color in a respective segment to ascertain a color that represents the respective segment; and
assigning a segment score for each segment in the set of segments, wherein the segment score for a respective segment is computed by aggregating color volume scores of each color in the respective segment.

6. The method of claim 5, wherein the segment score is determined by a product of the color volume score, a color lightness measure, and a color chroma measure, and
wherein the color having the highest segment score in a respective segment is designated to represent the respective segment.

7. The method of claim 1, wherein assembling the color palette comprises selecting a subset of segments, from the set of segments, satisfying a predetermined criterion for the color palette.

8. The method of claim 1, further comprising designating at least one segment in the set of segments having the highest color score to represent the responsive image.

9. The method of claim 1, further comprising selecting a predefined number of segments having the highest segment scores for assembling a color palette representation for a responsive image.

10. The method of claim 1, wherein the database further comprises a customer behavior score for each keyword in the set of keywords indicating user interest in the image, the customer behavior score based on previous searches indicating the user interest in the responsive image.

11. The method of claim 10, wherein the user interest is indicated by at least one of the following: the user purchasing the responsive image, the user hovering a cursor over a thumbnail version of the responsive image to view an enlarged version of the responsive image, and the user adding the responsive image to a favorites list.

12. The method of claim 10, further comprising:
aggregating customer behavior scores associated with each search query; and
identifying most relevant keywords or categories for a responsive image using the aggregated customer behavior scores.

13. The method of claim 10, further comprising:
aggregating customer behavior scores associated with each search query over a period of time; and
representing a customer activity for a specific period of interest using the aggregated customer behavior scores.

14. A system for providing a display of color palettes in response to a user search query, the system comprising:
a processor configured to execute operations to:
receive from a user a search query on a user interface of a computing device;
search a database to locate images responsive to the search query, wherein for each image, the database comprises an image representation and a set of keywords associated;
extract red, green, and blue (RGB) colors for each responsive image to provide extracted RGB colors from the responsive image;
create a reduced color palette comprising a plurality of colors for each responsive image based on a proximity of the extracted RGB colors in a RGB color space;
assign, to each of the plurality of colors for a responsive image, a color volume score and a color weight score, wherein the color volume score indicates a percentage of the responsive image covered by the respective color, and the color weight score indicates the percentage of the respective color in the responsive image;
ascertain a percentage of a set of proximate colors in the responsive image, wherein each color in the set of proximate colors is located within a predefined distance from the respective color in the RGB color space;
index the percentage of the set of proximate colors for the respective color, the color volume score, and the color weight score, in a search engine for a subsequent image search;

divide the extracted RGB colors for each responsive image into a set of segments representing visually distinct parts of a color spectrum;

assemble a color palette for each responsive image based on the extracted RGB colors; and provide for display of suggested color palettes for the search query based on the assembled color palettes for the responsive images.

15. The system of claim 14, wherein the processor is further configured to:

identify a measure of the distance between the respective color and the set of proximate colors in the RGB color space.

16. The system of claim 14, wherein the color weight score for a respective color is weighted based on the percentage for every color other than the respective color in the responsive image and the color distance in the RGB color space between the respective color and every color other than the respective color in the responsive image.

17. The system of claim 14, wherein assembling the color palette comprises selecting a subset of segments, from the set of segments, satisfying a predetermined criterion for the color palette.

18. A non-transitory machine-readable storage medium comprising machine-readable instructions for causing a processor to execute a method for providing a display of color palettes in response to a user search query, the method comprising:

receiving from a user a search query on a user interface of a computing device;

searching a database to locate images responsive to the search query, wherein for each image, the database comprises an image representation and a set of keywords associated with the image;

extracting red, green, and blue (RGB) colors for each responsive image to provide extracted RGB colors from the responsive image;

creating a reduced color palette comprising a plurality of colors for each responsive image based on a proximity of the extracted RGB colors in a RGB color space;

assigning, to each of the plurality of colors for a responsive image, a color volume score and a color weight score, wherein the color volume score indicates a percentage of the responsive image covered by the respective color, and the color weight score indicates the percentage of the respective color in the responsive image;

ascertaining a percentage of a set of proximate colors in the responsive image, wherein each color in the set of proximate colors is located within a predefined distance from the respective color in the RGB color space;

indexing the percentage of the set of proximate colors for the respective color, the color volume score, and the color weight score, in a search engine for a subsequent image search;

dividing the extracted RGB colors for each responsive image into a set of segments representing visually distinct parts of a color spectrum;

assembling a color palette for each responsive image based on the extracted RGB colors; and providing for display of suggested color palettes for the search query based on the assembled color palettes for the responsive images.

\* \* \* \* \*